United States Patent [19]
Bunnell

[11] Patent Number: 5,564,015
[45] Date of Patent: Oct. 8, 1996

[54] CPU ACTIVITY MONITORING THROUGH CACHE WATCHING

[75] Inventor: James C. Bunnell, Ontario, Calif.

[73] Assignee: AST Research, Inc., Irvine, Calif.

[21] Appl. No.: 581,305

[22] Filed: Dec. 28, 1995

Related U.S. Application Data

[63] Continuation of Ser. No. 241,767, May 12, 1994, abandoned.

[51] Int. Cl.[6] .................................................. G06F 11/34
[52] U.S. Cl. ........................... 395/184.01; 364/273.1; 364/DIG. 1; 395/750
[58] Field of Search ......................... 395/184.01, 459, 395/838, 750; 364/270, 273.1, 707

[56] References Cited

U.S. PATENT DOCUMENTS

| | | | |
|---|---|---|---|
| 4,980,836 | 12/1990 | Carter et al. | 364/200 |
| 5,287,508 | 2/1994 | Hejna, Jr. et al. | 395/650 |
| 5,325,499 | 6/1994 | Kummer et al. | 364/200 |
| 5,367,656 | 11/1994 | Ryan | 395/425 |
| 5,369,771 | 11/1994 | Gettel | 395/750 |

FOREIGN PATENT DOCUMENTS 9312480  6/1993  WIPO.

OTHER PUBLICATIONS

Dubois 'The Design of a lockup-Free cache for High Performance Multiprocessors' IEEE 1988 pp. 352–359.
*Microprocessors: vol. II 1994*; Intel Corporation; Published 1993; Mt. Prospect, Illinois; pp. 2–80 to 2–84.

*Primary Examiner*—Robert W. Beausoliel, Jr.
*Assistant Examiner*—Albert Decady
*Attorney, Agent, or Firm*—Knobbe, Martens, Olson & Bear

[57] ABSTRACT

A central processing unit ("CPU") activity monitor and method provides CPU activity information. The CPU activity monitor includes a timer and an activity event counter for receiving a plurality of mode signals from the CPU, a cache miss signal from a cache memory system, and a clock signal from a clock. An activity-to-inactivity value defines when the CPU transitions from an active state to an inactive state. An activity threshold defines when the CPU transitions from an inactive state to an active state.

20 Claims, 15 Drawing Sheets

| RETRIGGER TIMER ENABLE FLAG | TIME SIGNAL | EVENT OVERFLOW SIGNAL | TIME RESET SIGNAL |
|---|---|---|---|
| 0 | 0 | 0 | 0 |
| 0 | 0 | 1 | 0 |
| 0 | 1 | 0 | 0 |
| 0 | 1 | 1 | 0 |
| 1 | 0 | 0 | 0 |
| 1 | 0 | 1 | 0 |
| 1 | 1 | 0 | 0 |
| 1 | 1 | 1 | 1 |

FIG. 5

| MEMORY/IO SIGNAL | DATA CONTROL SIGNAL | READ/WRITE SIGNAL | BUS CYCLE |
| --- | --- | --- | --- |
| 0 | 0 | 0 | INTERRUPT ACKNOWLEDGE |
| 0 | 0 | 1 | HALT/SPECIAL CYCLE |
| 0 | 1 | 0 | I/O READ |
| 0 | 1 | 1 | I/O WRITE |
| 1 | 0 | 0 | INSTRUCTION FETCH |
| 1 | 0 | 1 | RESERVED |
| 1 | 1 | 0 | DATA WRITE CYCLE |
| 1 | 1 | 1 | DATA READ CYCLE |

FIG. 7

| READ ENABLE FLAG | WRITE ENABLE FLAG | CACHE MISS SIGNAL | DATA READ/WRITE CYCLE | EVENT DETECT SIGNAL |
|---|---|---|---|---|
| 0 | 0 | 0 | READ | 0 |
| 0 | 0 | 0 | WRITE | 0 |
| 0 | 0 | 1 | READ | 0 |
| 0 | 0 | 1 | WRITE | 0 |
| 0 | 1 | 0 | READ | 0 |
| 0 | 1 | 0 | WRITE | 0 |
| 0 | 1 | 1 | READ | 0 |
| 0 | 1 | 1 | WRITE | 1 |
| 1 | 0 | 0 | READ | 0 |
| 1 | 0 | 0 | WRITE | 0 |
| 1 | 0 | 1 | READ | 1 |
| 1 | 0 | 1 | WRITE | 0 |
| 1 | 1 | 0 | READ | 0 |
| 1 | 1 | 0 | WRITE | 0 |
| 1 | 1 | 1 | READ | 1 |
| 1 | 1 | 1 | WRITE | 1 |

FIG. 8

| RETRIGGER EVENT ENABLE FLAG | TIME SIGNAL | TIME OVERFLOW SIGNAL | EVENT RESET SIGNAL |
|---|---|---|---|
| 0 | 0 | 0 | 0 |
| 0 | 0 | 1 | 0 |
| 0 | 1 | 0 | 0 |
| 0 | 1 | 1 | 0 |
| 1 | 0 | 0 | 0 |
| 1 | 0 | 1 | 0 |
| 1 | 1 | 0 | 0 |
| 1 | 1 | 1 | 1 |

FIG. 9

| ACTIVITY NOTIFY FLAG (INPUT) | INACTIVITY NOTIFY FLAG (INPUT) | ACTIVITY EVENT FLAG (INPUT) | INACTIVITY EVENT FLAG (INPUT) | INTERRUPT REQUEST (OUTPUT) | ACTIVITY NOTIFY FLAG (OUTPUT) | INACTIVITY NOTIFY FLAG (OUTPUT) |
|---|---|---|---|---|---|---|
| 1 | 1 | 0 | 0 | 0 | 1 | 1 |
| 1 | 1 | 0 | 1 | 1 | 1 | 0 |
| 1 | 1 | 1 | 0 | 1 | 0 | 1 |
| 1 | 0 | 0 | 0 | 0 | 1 | 0 |
| 1 | 0 | 0 | 1 | 0 | 1 | 0 |
| 0 | 0 | 1 | 0 | 1 | 0 | 1 |
| 0 | 1 | 0 | 1 | 0 | 1 | 1 |
| 0 | 1 | 1 | 0 | 1 | 0 | 1 |

FIG. 11

CPU ACTIVITY MONITORING THROUGH CACHE WATCHING

This application is a continuation of U.S. patent application Ser. No. 08/241,767, filed May 12, 1994, now abandoned.

BACKGROUND OF THE INVENTION

1. Field of the Invention

This invention relates to computer power control systems and, more particularly, to a central processing unit ("CPU") activity monitor, and a method for monitoring CPU activity.

2. Background of the Invention

Power management systems are commonly used in computers to reduce power consumption. Such power management systems are useful in connection with meeting environmental regulations, reducing operating costs, and extending operating periods of battery-powered, or limited power-source computers. Generally, power management systems reduce the power consumed by inactive components, peripherals and other devices within or connected to the computer. However, to operate efficiently, power management systems need timely information regarding the activity levels of various components.

In order to efficiently control power consumption, power management systems often deactivate unused components, reduce clock speeds, suspend activity, turn inactive components off, etc. Therefore, an efficient power management system needs accurate information regarding the activity status of a particular component. Untimely, or inaccurate information on the activity status of components leads to inefficient power management which can diminish battery life, reduce computer performance, and limit the number of supportable system configurations.

If activity information falsely indicates that a component is active when in fact it is inactive, the power management system fails to reduce power consumption. If activity information falsely indicates that a component is inactive when in fact it is active, the power management system deactivates a needed component, thus slowing system response time.

Generally, power management is a joint effort between software and hardware. Together, the hardware and software form a power management system. Typically the power management software implements the power management strategy of controlling hardware devices. The power management software selects which devices to monitor, monitors system activity, and device activity, and triggers power management functions.

Conventional power management software often monitors accesses to input/output devices, interrupt requests, and memory accesses in order to adjust power consumption rates. In one approach, power management software monitors the accesses to a component or peripheral assigned to a particular memory location. Such memory mapped devices allow the power management software to monitor memory accesses to determine device activity. However, the power management software must know which memory location is assigned to a device. In addition, the power management software must be modified whenever a computer system is reconfigured with different devices.

In addition to software monitoring, hardware can also provide information regarding the usage of the components and peripherals in order to control power consumption. At present, a number of approaches exist in the prior art that measure and control power usage. For example, peripherals, components and other devices have internal power management circuitry that provides activity information. In addition, some peripherals can monitor themselves and deactivate themselves when a period of inactivity occurs. Such self-deactivation is often called a self time-out. Typically, the power management software can access the power management functions of the peripheral and set activity parameters such as the interval for an inactivity time-out.

A device with internal power management functions can also interact with the power management software to provide information on system activity. For example, when a device transitions from an active state to an inactive state, the internal circuitry signals the power management software that the device is inactive. The power management software can reduce the device's clock speed, stop the clock speed, turn the power off, etc. If, on the other hand, a device transitions from an inactive state to an active state, the internal circuitry signals the power management software to activate the device. The power management software can increase the clock speed to the device, restart the clock, turn the power on, etc.

In conventional power management systems, the internal circuitry of a device communicates to the power management software via an interrupt. The internal circuitry of a device generates a power system interrupt when the device transitions from one activity state to another. The power system interrupt, sometimes called a trap, causes the microprocessor to suspend its current operations, save the status of its work, and transfer control to the power system software. The power system software then determines what caused a power system interrupt, obtains the necessary information, and controls hardware devices accordingly.

Many devices such as disk drive controllers, keyboard controllers, and other input/output devices now incorporate internal circuitry to monitor device activity. Therefore, some power management systems allow the monitoring of most peripherals and components. However, conventional power management systems fail to provide accurate information regarding the activity of the central processing unit ("CPU").

The CPU is a significant power consuming device. To control CPU power usage, the power management software needs accurate information about CPU activity. Current methods of obtaining information regarding CPU activity include monitoring interrupts, modem rings and parity errors. However, the CPU can be engaged in active work without communicating via a modem, generating interrupts or generating parity errors. Therefore, a CPU activity monitoring system that only monitors interrupts, modem rings and parity errors can falsely indicate that the CPU is inactive.

Other conventional CPU monitoring devices monitor memory accesses to determine CPU activity. Monitoring of memory accesses can falsely indicate that the CPU is active since accesses to memory can include accesses to the stack, instruction cycles, access to memory mapped input/output devices, and data read/write cycles when the CPU is waiting for a certain event to occur. For example, if the CPU is executing a continuous loop while waiting for some event to happen the CPU could repetitively access the same memory locations for instructions and data. Therefore, in order for memory accesses to provide CPU activity information, the power management software needs to analyze and to bias data accesses appropriately.

In order to determine if the CPU is engaged in useful work, the power management system needs to know when the CPU is executing an "activity event" that signifies a new action by the CPU. The CPU is engaged in useful activity when the CPU does not repetitively access the same memory locations. Therefore it is desirable to differentiate repetitive CPU memory accesses (i.e. accesses to the stack, to the instructions in a repeating routine, or to data locations in a repeating routine) from non-repetitive memory accesses that signify the CPU is engaged in useful activity.

In order to analyze memory accesses, the power management system must track which memory locations the CPU accesses and how often the CPU accesses such locations. Therefore, monitoring memory accesses often requires storing past memory accesses and comparing each new memory access with past memory accesses to determine when the CPU is engaged in productive work. Such an approach requires exclusive CPU processing power and memory.

Other approaches that monitor memory accesses to determine CPU activity require the power management software to know where the stack, operating system, and other frequently used memory locations are located within the CPU memory. However, in this approach the power management software must be configured to the computer and operating system. In addition, the power management software must adapt whenever the computer system is reconfigured.

Furthermore, multi-tasking operating systems complicate the monitoring of memory accesses. Since multi-tasking operating systems often shift applications to different memory locations, the power management software needs additional information from the multi-tasking operating system in order to track repetitive accesses to frequently used memory locations.

SUMMARY OF THE INVENTION

The problems outlined above are in large measure solved by the method and apparatus of the present invention. That is, the CPU activity monitoring device of the present invention provides information regarding whether the CPU is performing useful work. Adjustable parameters allow the CPU activity monitor to provide accurate and real time CPU activity monitoring information. The present invention also reduces the complexity of past CPU monitoring devices and methods.

Accurate, real time CPU activity information allows the power management software to conserve power consumption. Better control of power consumption enhances heat dissipation and battery performance, allows smaller batteries, and provides more computer time from each battery charge. Accordingly, the present CPU activity monitoring device allows the design of smaller and lighter portable devices. Lower power consumption also allows computers to better meet environmental regulations and decrease operating costs.

Furthermore, the CPU activity monitoring device of the present invention offers flexibility for future computer designs and configurations. The CPU activity monitoring device does not need information regarding the operating system, the configuration of the memory map, input/output devices, peripherals and other components. Thus the CPU activity monitoring device does not need system customization and can operate transparent to the user or the applications software. Thus, a user need not set CPU power management parameters.

A further feature of the present invention allows the power management software to selectively change parameters. The power management software adjusts the CPU activity monitoring device, and sets internal registers in order to define a monitoring interval, an activity-to-inactivity transition value, and an activity threshold.

Broadly speaking, the present invention contemplates a CPU monitoring device which uses hardware to monitor CPU accesses to main memory. The CPU activity monitor monitors a microprocessor with a CPU and a cache memory system. The CPU and cache memory system connect to the CPU activity monitor via a cache miss signal, a plurality of mode signals, the address bus, and the data bus. The plurality of mode signals communicate the operating modes of the types of memory accesses executed by the microprocessor such as instruction fetch cycles, memory read cycles, and (3) memory write cycles.

In addition, the cache memory system includes memory for holding the most recently used information for future reuse by the CPU. Thus, the CPU views the cache as another memory module. The cache memory system asserts a cache miss signal when the microprocessor accesses a storage location that does not exist in the cache memory system (a miss). If the requested data is not in the cache, the CPU accesses main memory.

In order to provide more accurate information about the CPU, the present invention ignores instruction cycles and only monitors data read and write cycles. Instruction fetch cycles can generate cache miss signals that falsely indicate that the CPU is actively engaged in useful work. For example, in multi-tasking systems, the CPU often swaps concurrently operating applications in and out of the cache while the CPU is waiting for some event to occur.

In a preferred embodiment of the present invention, cache miss information combined with data write cycles can provide useful CPU activity information. For example, if the CPU is executing a continuous loop while waiting for some event to happen, the CPU could repetitively access the same memory locations for data. If the CPU repetitively accesses the same memory locations, the cache memory system stores the needed data. Thus a cache miss does not occur. If however, the CPU is actively engaged in useful work, the CPU accesses a variety of memory locations periodically generating a cache miss.

In addition, the CPU activity monitor receives a clock signal. The CPU activity monitor uses the clock signal, the cache miss signal, and the plurality of mode signals to determine when the CPU transitions from an active to an inactive state, or to determine when the CPU transitions from an inactive to an active state. The present invention determines CPU activity by counting the number of activity events that occur within a certain time interval. The preferred embodiment defines a CPU activity event as a CPU data write cycle that generates a cache miss signal.

In another aspect of the present invention, the CPU activity monitor communicates CPU activity information to the power management software. The power management software initializes the CPU activity monitor and implements the power management strategy of controlling the CPU. The CPU activity monitor communicates with the power management software via interrupt requests. To conserve power, the power management software can reduce CPU clock speeds, and suspend CPU activity when the CPU is inactive.

The power management software can obtain CPU activity information by accessing status flags that the CPU activity monitor maintains in a control register. The status flags include an activity event flag and an inactivity event flag that are accessible by the CPU. The activity and inactivity event flags indicate the activity status of the CPU.

In addition to CPU status information, the CPU activity monitor also maintains notification flags that determine when to generate an interrupt. Two flags, the activity notification flag and the inactivity notification flag, command the CPU activity monitor to notify the power management software when the CPU transitions from one state to another. Accordingly, the activity notification flag directs the CPU activity monitor to generate an interrupt when the CPU transitions from inactivity to activity. The inactivity notification flag directs the CPU activity monitor to generate an interrupt when the CPU transitions from activity to inactivity.

A further aspect of the invention is that an activity-to-inactivity transition value, and an activity threshold determine whether the CPU is active or inactive. The activity-to-inactivity transition value represents the number of CPU activity events that the CPU activity monitor counts within a certain time interval. If the CPU monitor fails to count the number of activity events specified by the activity-to-inactivity transition value, the CPU is inactive. The activity threshold represents the number of successive time intervals in which the number of CPU activity events must rise above the activity-to-inactivity transition value. If the CPU executes enough activity events to rise above the activity-to-inactivity transition value, for the specified number of successive time intervals, the CPU is active.

In accordance with the method of the invention, the CPU generates a plurality of mode signals that correspond to the operating mode of the CPU, and a cache memory system generates a cache miss signal when data requested by the CPU is not stored in the cache memory. The plurality of mode signals and the cache miss signal determine an activity event.

A timer defines the expiration of a time interval and a counter counts each activity event that occurs within the time interval. The count is compared to the activity-to-inactivity transition value and an inactivity event signal is generated when the count is less than or equal to the activity-to-inactivity transition value at the expiration of the time interval. In addition, the number of successive time intervals where the number of CPU activity events rise above the activity-to-inactivity transition point is compared to the activity threshold. An activity event signal is generated when the number of successive time intervals is equal to or greater than the activity threshold.

These and other aspects, advantages, and novel features of the invention will become apparent upon reading the following detailed description and upon reference to accompanying drawings in which:

BRIEF DESCRIPTION OF THE DRAWINGS

FIG. 5 is a truth table of the generation of the time reset signal from the retrigger timer enable flag, the time signal, and the event overflow signal.

FIG. 7 is a cycle decode table of CPU mode signals: the memory/IO signal, the data/control signal, and the read/write signal.

FIG. 8 is a truth table for generating the event detect signal from the read enable flag, the write enable flag, and the cache miss signal for various read/write cycles.

FIG. 9 is a truth table for the generation of the event reset signal, the retrigger event enable flag, the time signal, and the event overflow signal.

FIG. 11 is a truth table of the interrupt generator which responds to the activity notify flag input, inactivity notify flag input, and the activity event flag input, the inactivity event flag, to generate the interrupt request output, the activity notify flag output, and the inactivity notify output.

DETAILED DESCRIPTION OF THE INVENTION

Figure 1:
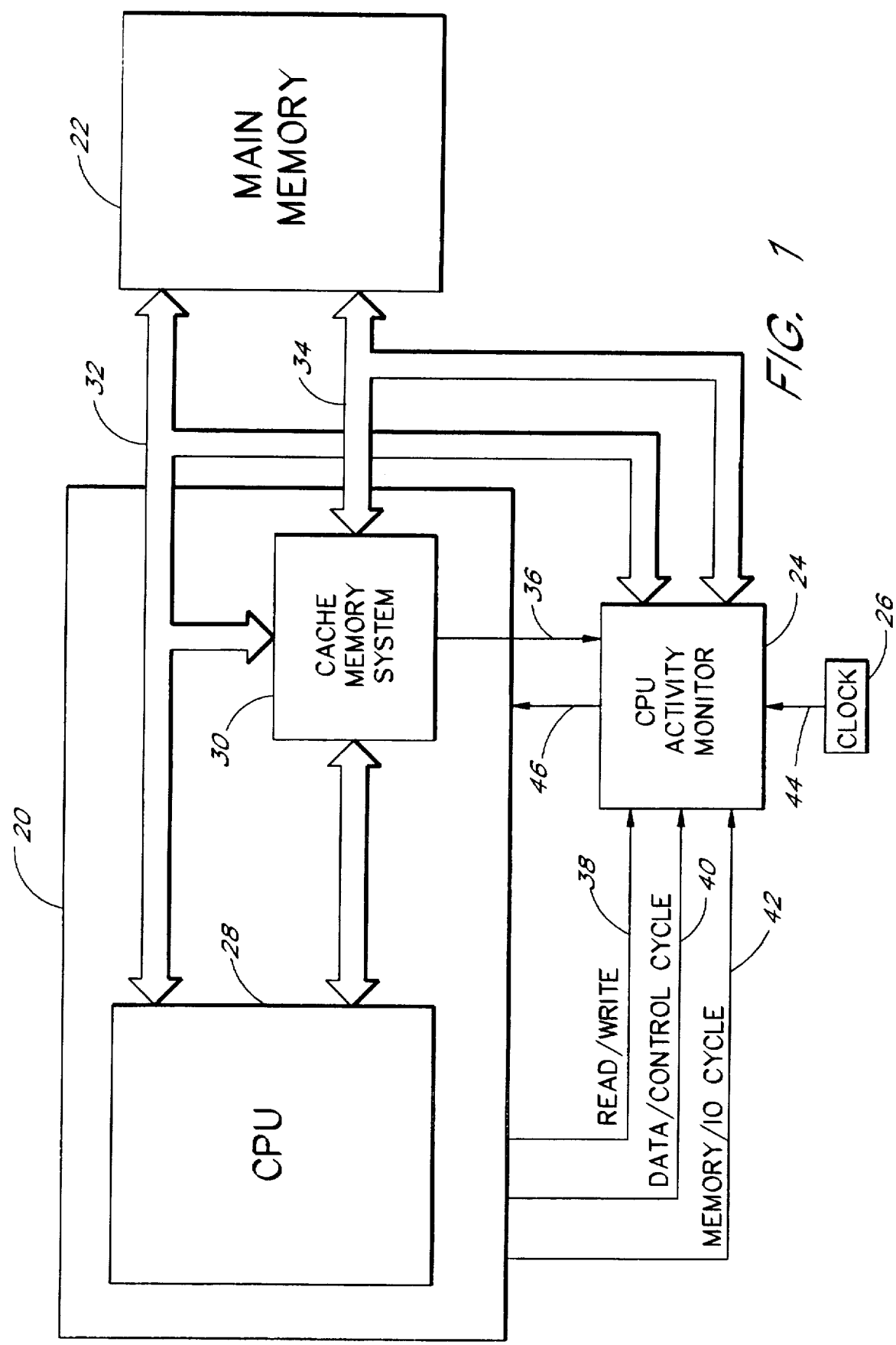
FIG. 1 is a block diagram of the CPU activity monitoring system comprising a microprocessor, a main memory, a CPU activity monitor, and a clock.

FIG. 1 illustrates a block diagram of a power management system that includes a microprocessor 20, a main memory 22, a CPU activity monitor 24, and a clock 26. The microprocessor 20 further includes a central processing unit ("CPU") 28 and a cache memory system 30. The microprocessor 20 communicates to the CPU activity monitor 24 via a cache miss signal 36 and a plurality of mode signals 38, 40, and 42, an address bus 32, and a data bus 34. As explained in more detail below, the plurality of mode signals include a read/write signal 38, a data/control signal 40, and a memory/IO signal 42 that communicate the operating mode of the microprocessor 20.

The cache memory system 30 generates the cache miss signal 36 when the microprocessor 20 must access the main memory 22. Whenever the CPU 28 requests data, the cache memory system 30 checks to see if data already exists in the cache memory system 30 (a hit). If the data does not exist in the cache memory system 30 (a miss), the CPU 28 accesses the main memory 22. Thus, the cache memory system 30 generates the cache miss signal 36 when the CPU 28 accesses data that is not stored in the cache memory system 30.

The CPU activity monitor 24 monitors the number of CPU activity events that occur during a certain time interval. In the preferred embodiment, the duration of the time interval has a range of one to tens of milliseconds. The clock 26 which generates a clock signal 44 is a system clock or a division of the system clock. The CPU activity monitor 24 uses the cache miss signal 36, the clock signal 44, and the plurality of mode signals 38, 40, and 42 to generate an interrupt request 46. The interrupt request 46 connects to the microprocessor 20 and initiates a power system interrupt service routine.

Figure 2:
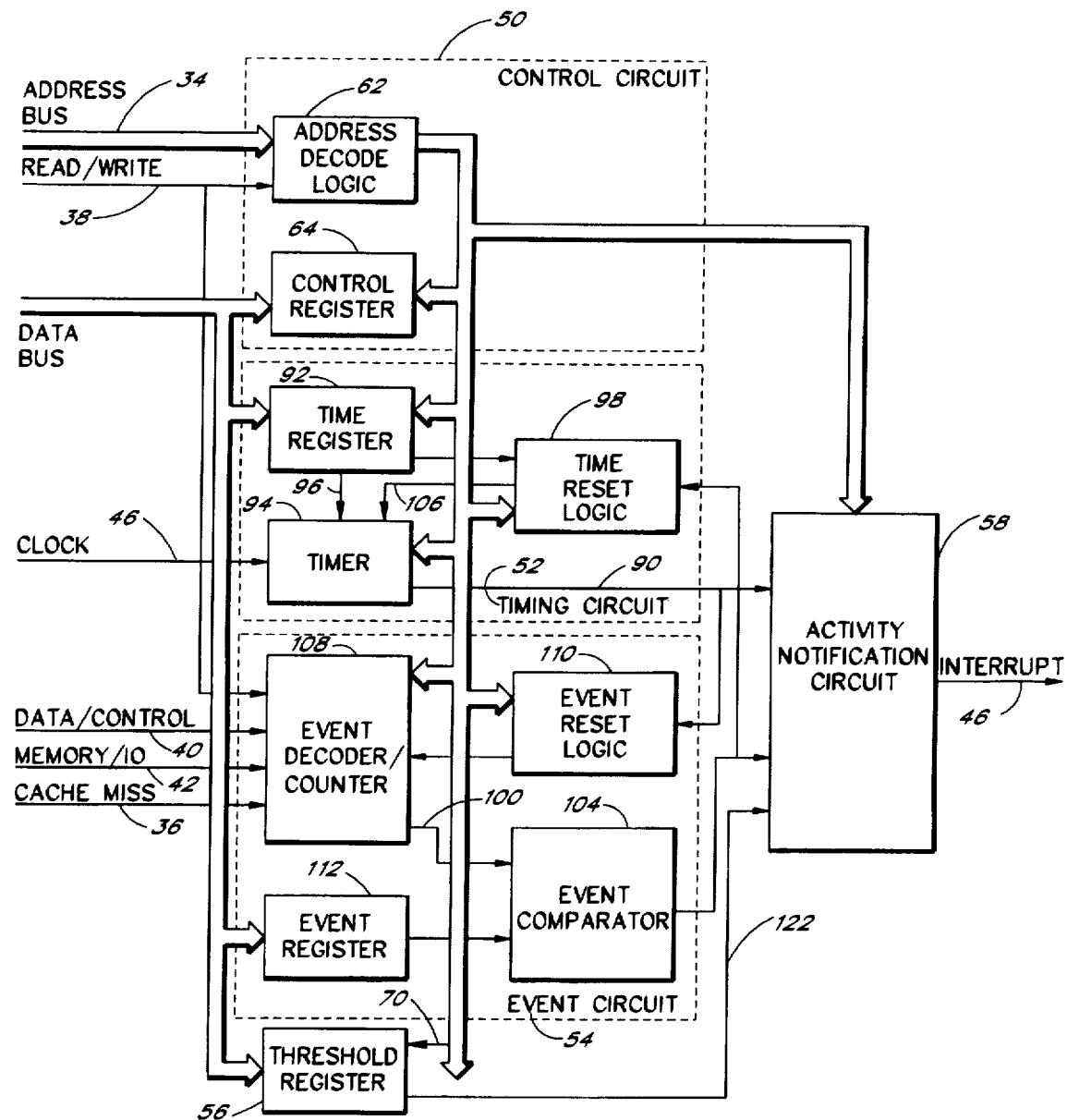
FIG. 2 is a block diagram of the CPU activity monitor showing an internal control bus connecting a control circuit, a timing circuit, an event circuit, a threshold register, and an activity notification circuit.

FIG. 2 illustrates a block diagram of the CPU activity monitor 24 constructed in accordance with the present invention. The CPU activity monitor 24 includes a control circuit 50, a timing circuit 52, an event circuit 54, a threshold register 56, and an activity notification circuit 58. A control bus 60 interconnects the control circuit 50, the timing circuit 52, the event circuit 54, the threshold register 56, and the activity notification circuit 58.

Figure 3:
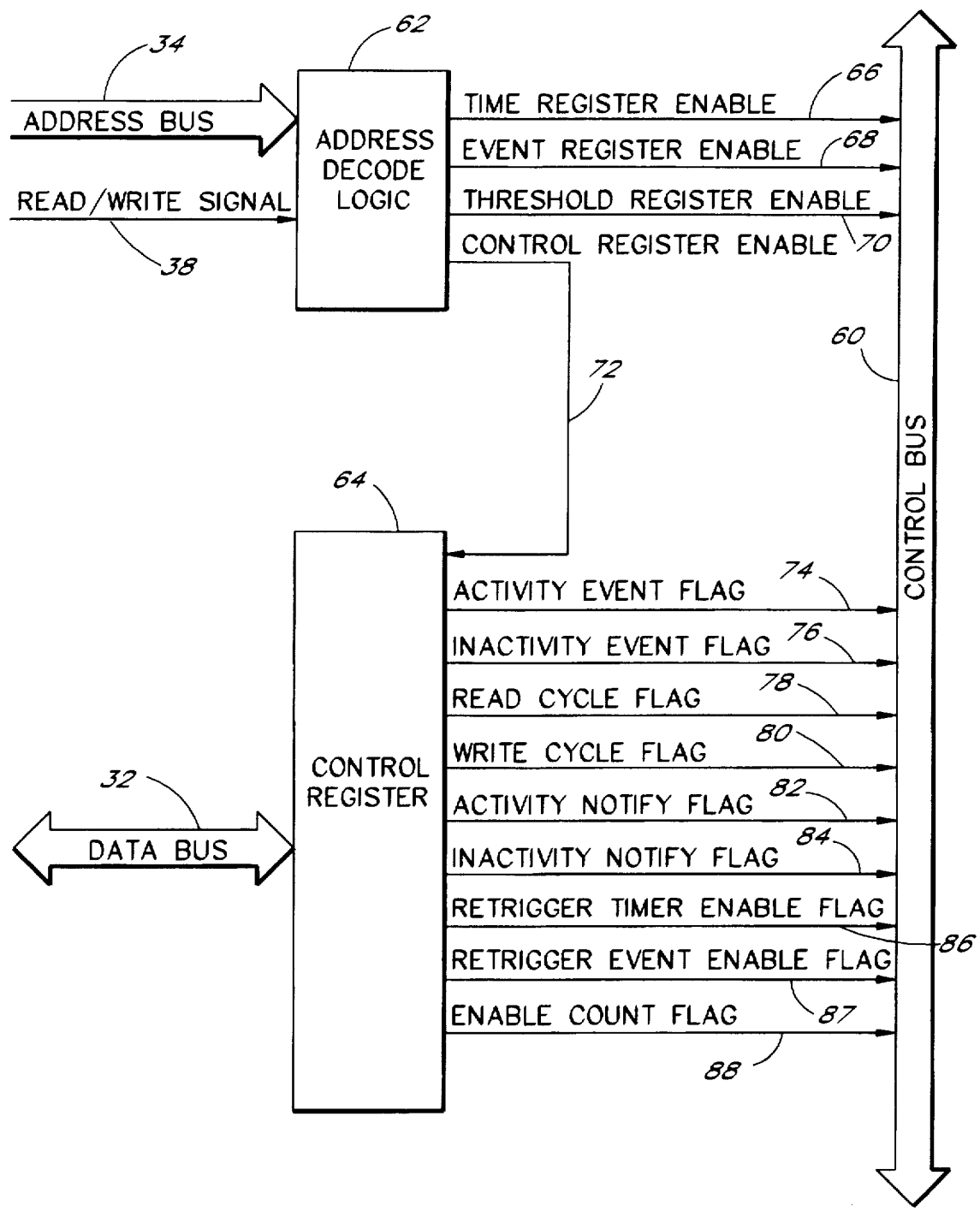
FIG. 3 is a block diagram of the control circuit showing the address decode logic and the control register.

The control circuit 50, as illustrated in FIG. 3, includes address decode logic 62 and a control register 64. The microprocessor 20 communicates with the control circuit 50 via the address bus 32, the data bus 34, and the read/write signal 38. The address bus 32 and the read/write signal 38 connect to the address decode logic 62, and the data bus 34 connects to the control register 64. The address decode logic 62 monitors the address lines of the address bus 32 to determine when the microprocessor 20 wishes to read or write data to the CPU activity monitor 24. The address decode logic 62 in turn, generates enable signals to various registers within the CPU activity monitor 24. In the preferred embodiment, the address decode logic 62 outputs a time register enable signal 66, an event register enable signal 68 signal, and a threshold register enable signal 70.

A control register enable signal 72 connects to the control register 64. The control register 64 stores configuration information received from the microprocessor 20 via the data bus 34. The control register 64 stores an activity event flag 74, an inactivity event flag 76, a read cycle flag 78, a write cycle flag 80, an activity notify flag 82, an inactivity notify flag 84, a retrigger timer enable flag 86, a retrigger event enable flag 87, and an enable count flag 88. The control register 64 outputs these flags onto the control bus 60.

Figure 4:
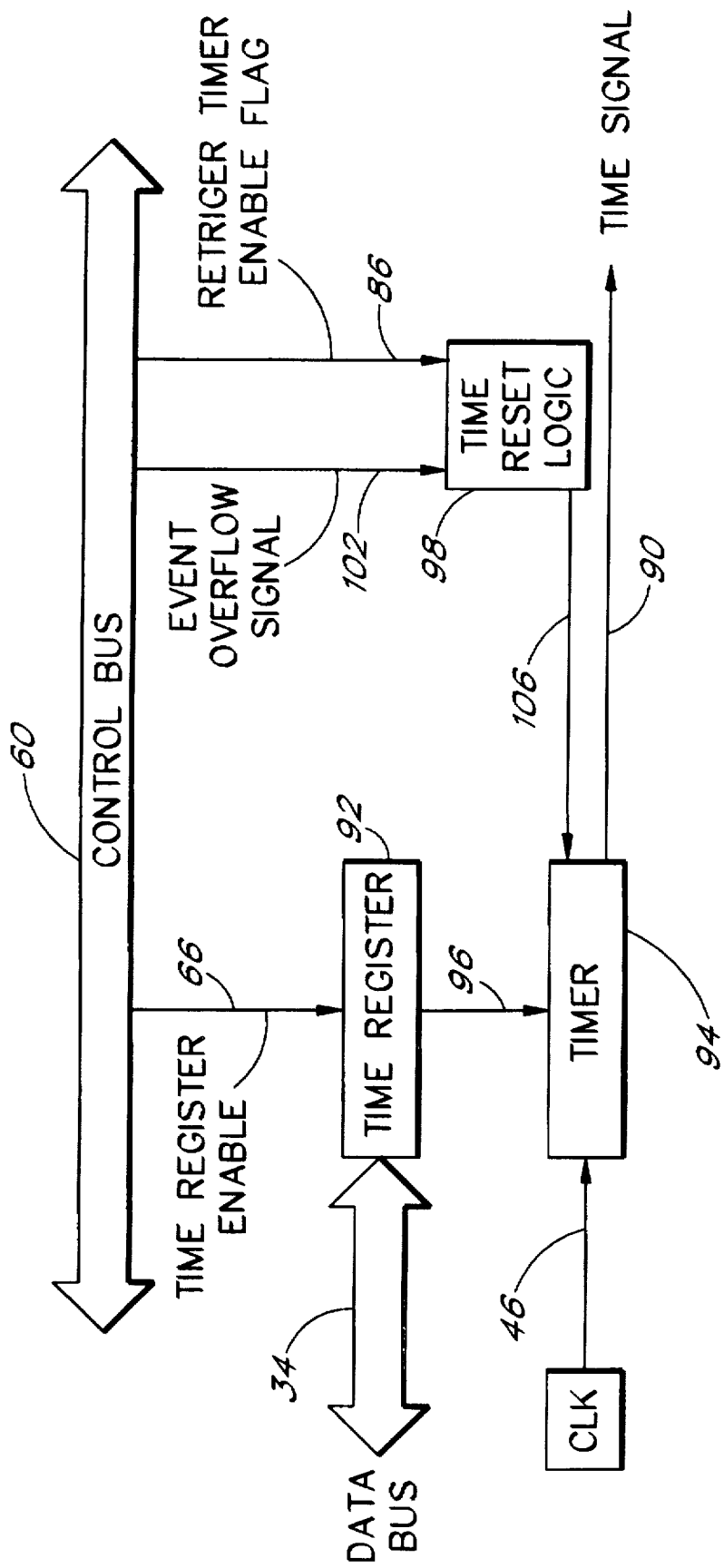
FIG. 4 s a block diagram of the timing circuit showing a time register, a time value counter, a comparator and reset logic.

The timing circuit 52, as illustrated in FIGS. 2 and 4, includes a time register 92, a timer 94, and time reset logic 98. The time register enable signal 66 from the address decode logic 62 connects to the time register 92 and allows the microprocessor 20 to load the time register 92 via the data bus 34 with a time interval value. As will be explained in more detail below, the time interval value stored in the time register 92 represents the number of clock pulses that occur during a time interval.

The time register 92 loads the timer 94 with the time interval value via a time interval signal 96. The clock signal 44 drives the timer 94 such that each clock cycle causes the timer 94 to count down. By counting each clock pulse, the timer 94 monitors time durations in the computer system. When the timer 94 reaches zero, it generates the time signal 90. In alternative embodiments, the timer 94 is set to zero and counts up. A comparator (not shown) compares the value of the timer 94 to the value stored in the time register 92. When the value of the timer 94 is equal to or greater than the value stored in the time register 92, the comparator generates the time signal 90.

The timing circuit 52 also includes the time reset logic 98 for periodically resetting the timer 94. Two control lines, an event overflow signal 102 and the retrigger timer enable flag 86 determine when to assert a reset signal 106. The retrigger timer enable flag 86 originates from the control register 64. The event overflow signal 102 originates from an event comparator 104 and is explained in more detail below. FIG. 5 illustrates a truth table for generating the time reset signal 106 from the event overflow signal 102, the retrigger timer enable flag 86, and the time signal 90. The time reset signal 106 resets the timer 94 and commands the timer 94 to reload the time interval value from the time interval signal 96.

Turning now to the event circuit 54 illustrated in FIG. 2, the event circuit 54 includes an event decoder/counter 108, event reset logic 110, an event register 112, and the event comparator 104. As illustrated in more detail in FIG. 6, the event decoder/counter 108 includes an event decoder 113 and an event counter 114. The event decoder 113 monitors the read cycle flag 78, the write cycle flag 80, the read/write signal 38, the data/control signal 40, the memory/IO signal 42, and the cache miss signal 36 to generate an event detect signal 116.

The microprocessor 20 provides the read/write signal 38, the data/control signal 40, and the memory/IO signal 42 as inputs to the event decoder 113. The truth table illustrated in FIG. 7 shows how the event decoder 113 monitors the read/write signal 38, the data/control signal 40, and the memory/IO signal 42 to determine when the CPU 28 executes a data read or a data write cycle. As the truth table shows, when the CPU 28 executes a data write cycle, it asserts the memory/IO signal 42 and the data/control signal 40 and does not assert the read/write signal 38. When the CPU 28 executes a data read cycle or data write cycle, the CPU 28 asserts the memory/IO signal 42, the data/control signal 40, and the read/write signal 38.

In the preferred embodiment, the CPU activity monitor 24 monitors CPU data write cycles to main memory; however, the CPU activity monitor 24 can also be configured to monitor CPU data read cycles. The read cycle flag 78 and the write cycle flag 80 direct the CPU activity monitor 24 regarding which cycles to monitor. The control register 64 stores the read cycle flag 78 and the write cycle flag 80. If the read cycle flag 78 is asserted, the CPU activity monitor 24 monitors data read cycles. If the write cycle flag 80 is asserted the CPU activity monitor 24 monitors data write cycles. In the preferred embodiment, only the write cycle flag 80 is asserted. Therefore, the event decoder 113 only monitors a data write cycle that generates the cache miss signal 36.

The truth table in FIG. 8 shows the output of the event detect signal 116 in response to the read cycle flag 78, the write cycle flag 80, the data read cycle, the data write cycle, and the cache miss signal 36. As the truth table indicates, if the write cycle flag 80 is enabled, the event decoder 113 generates the event detect signal 116 when the cache miss signal 36 occurs during a data write cycle. If the read cycle flag 78 is enabled, the event decoder 113 generates the event detect signal 116 when the cache miss signal 36 occurs during a data read cycle. If both the read cycle flag 78 and the write cycle flag 80 are enabled, the event decoder 113 generates the event detect signal 116 when the cache miss signal 36 occurs on either a data read cycle or a data write cycle.

The event detect signal 116 drives the event counter 114. The event counter also receives the enable count flag 88. If the enable count flag 88 is asserted, the event counter 114 counts each instance that the event decoder 113 asserts the event detect signal 116. If the enable count flag 88 is not asserted, the event counter 114 ignores the event detect signal 116. The event counter 114 outputs an event value 100 to the event comparator 104 and the activity notification circuit 58.

The microprocessor 20 loads the activity-to-inactivity transition value into the event register 112. The microprocessor 20 loads the event register 112 via the data bus 34. The CPU activity monitor 24 uses the value stored in the event register 112 to determine when the CPU 28 transitions to an inactive state.

The output of the event register 112 and the output of the event counter 114 connect to the event comparator 104. The event comparator 104 compares the value of the event counter 114 with the value stored in the event register 112. When the value of the event counter 114 is greater than or equal to the value of the event register 112, the event comparator 104 generates the event overflow signal 102.

The event circuit 54 also includes the event reset logic 110. The event reset logic 110 receives the time signal 90, the retrigger event enable flag 87, and the event overflow signal 102. The event reset logic 110 resets the event counter 114 with a event reset signal 120 as described by the truth table in FIG. 9. The event reset logic 110 resets the event counter 114 if the time signal 90 or the event overflow signal 102 is active when the retrigger event enable flag 87 is asserted.

Turning to the threshold register 56 in FIG. 2, the microprocessor 20 stores the activity threshold in the threshold register 56. The activity threshold represents the number of successive time intervals in which the CPU 28 remains active. The threshold register 56 receives data from the microprocessor 20 via the data bus 34, and receives the threshold register enable signal 70 from the address decode logic 62 via the control bus 60. The value stored in the threshold register 56 inputs into the activity notification circuit 58 via a threshold value signal 122.

Figure 10:
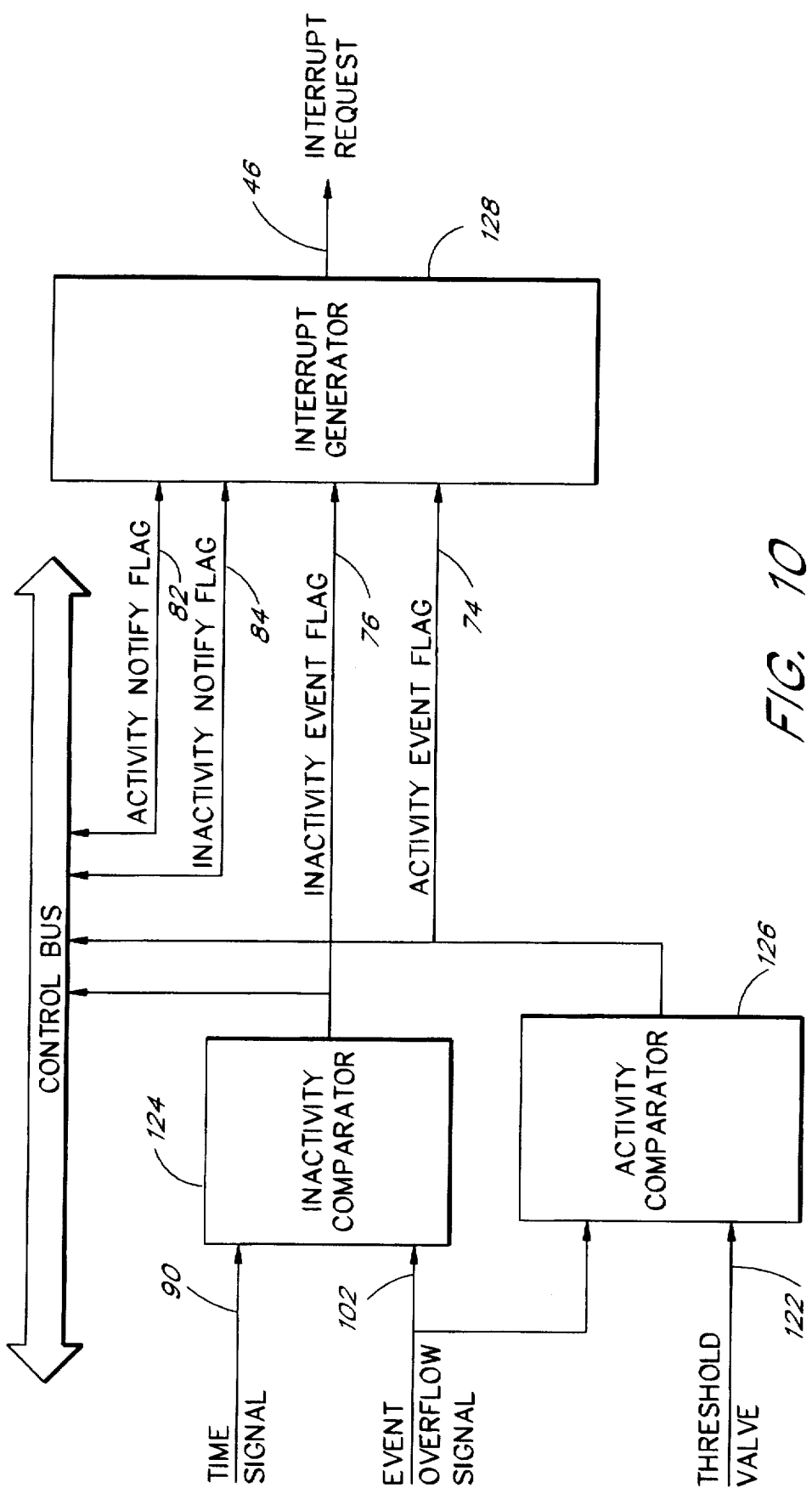
FIG. 10 is a block diagram of the activity notification circuit showing an inactivity comparator, an activity comparator, and an interrupt generator.

FIG. 10 illustrates a block diagram of the activity notification circuit 58. The activity notification circuit 58 determines when the CPU 28 transitions from one activity state to another. The activity notification circuit 58 includes an inactivity comparator 124, an activity comparator 126, and an interrupt generator 128. The inactivity comparator 124 monitors the transition of the CPU 28 from an active state to an inactive state. The activity comparator 126 monitors the transition of the CPU 28 from an inactive state to an active state.

The inactivity comparator 124 receives the time signal 90 and the event overflow signal 102, and generates the inactivity event flag 76. If the timer 94 expires and generates the time signal 90 before the event overflow signal 102, the inactivity comparator 124 asserts the inactivity event flag 76. If, on the other hand, the event overflow signal 102 is asserted before the expiration of the timer 94, the inactivity comparator 124 does not assert the inactivity event flag 76. Thus, the inactivity comparator 124 only asserts the inactivity event flag 76 when the timer 94 asserts the time signal 90 before the event overflow signal 102. The inactivity event flag 76 outputs to the control register 64, and the interrupt generator 128.

The activity comparator 126 receives the event overflow signal 102 from the event comparator 104, and the threshold value 122 from the threshold register 56. The activity comparator 126 in turn generates the activity event flag 74. In order to determine when the CPU 28 transitions from an inactive state to active state, the activity comparator 126 counts each occurrence of the event overflow signal 102 and compares it to the value in the threshold register 56.

Each occurrence of the event overflow signal 102 indicates that the CPU 28 executed enough activity events to rise above the activity-to-inactivity transition value. Each event overflow signal 102 increments the activity comparator 126. When the event overflow signal 102 count is equal to or greater than the threshold register 56, the activity comparator 126 generates the activity event flag 74. In other words, the CPU 28 must rise above the activity-to-inactivity transition value for successive time intervals before the activity comparator 126 will set the activity event flag 74.

The interrupt generator 128 receives the inactivity event flag 76, the activity event flag 74, the inactivity notify flag 84, and the activity notify flag 82. The interrupt generator 128, in turn, also generates the activity notify flag 82, the inactivity notify flag 84, and the interrupt request 46. The interrupt generator 128 generates the interrupt request 46 when the CPU 28 transitions from an active state to an inactive state, or when the CPU 28 transitions from an inactive state to an active state.

If the CPU 28 is active, the inactivity notify flag 84 is asserted to signal the interrupt generator 128 to generate an interrupt request if the CPU 28 transitions to an inactive state. In other words, the inactivity notify flag 84 commands the interrupt generator 128 to notify the power management software (generate an interrupt) if the CPU 28 transitions to an inactive state.

If the CPU 28 is inactive, the activity notify flag 82 is asserted to signal the interrupt generator 128 to generate an interrupt request if the CPU 28 transitions to an active state. In other words, the activity notify flag 82 commands the interrupt generator 128 to notify the power management software by generating an interrupt if the CPU 28 transitions to an active state.

For example, if the CPU 28 transitions from an inactive state to an active state, the interrupt generator 128 generates the interrupt request 46, and because the CPU 28 is active, the interrupt generator 128 clears the activity notify flag 82 and sets the inactivity notify flag 84. Setting the inactivity notify flag 84 signals the interrupt generator 128 to generate an interrupt (notify the power management software) if the CPU 28 transitions to an inactive state.

FIG. 11 illustrates a truth table for the flags input to the interrupt generator 128 and the resulting outputs. The activity notify flag 82, the inactivity notify flag 84, the activity event flag 74, and the inactivity event flag 76 are input to the interrupt generator 128. The interrupt generator 128 in turn outputs the interrupt request 46, and updates the activity notify flag 82 and the inactivity notify flag 84.

Figure 12A:
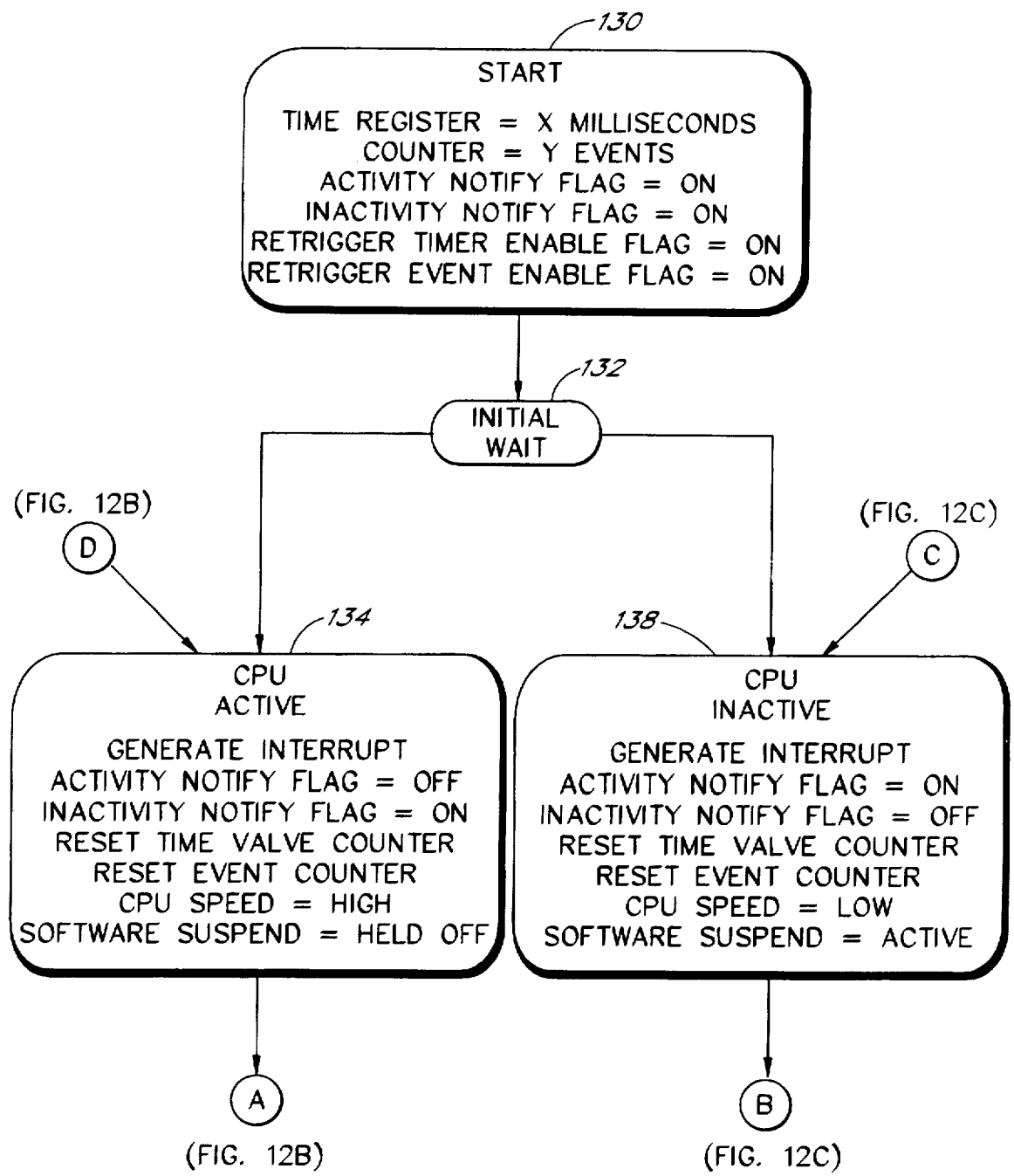
FIGS. 12A, 12B, and 12C show a state diagram of a method for operating a CPU activity monitor according to the present invention.
Figure 12B:
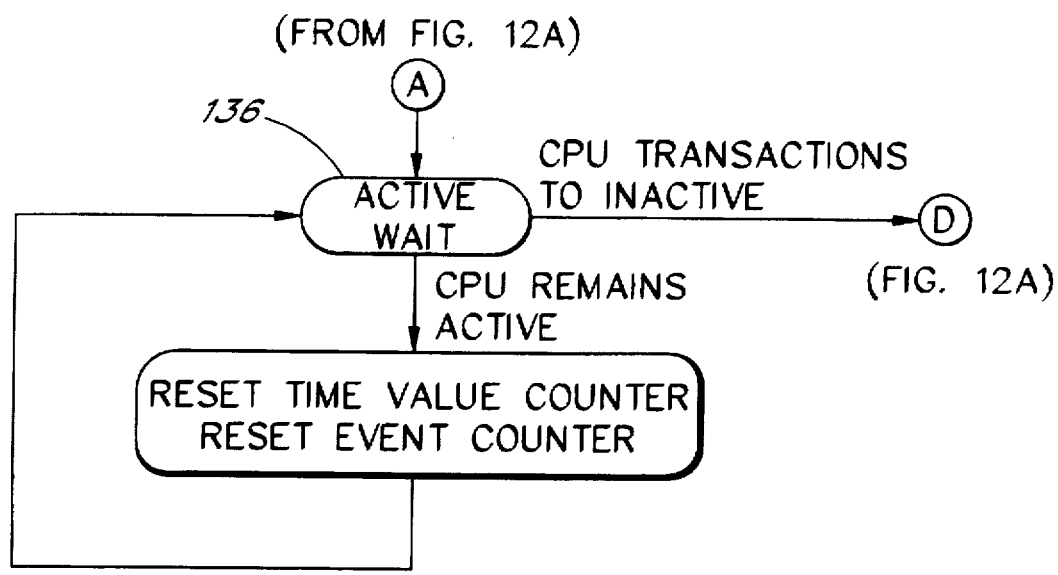
Figure 12C:
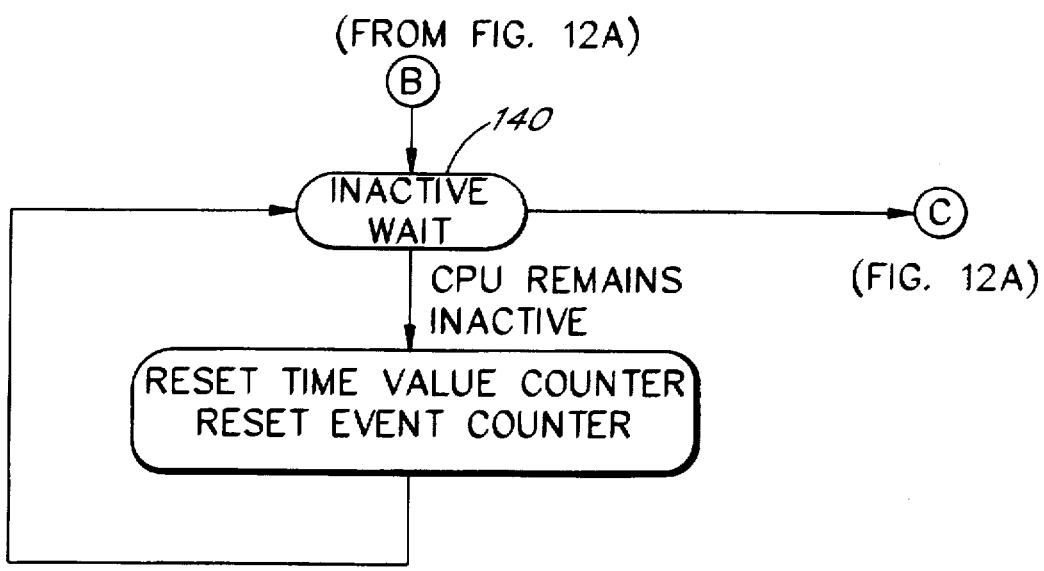

FIG. 12A, 12B, and 12C illustrate a state diagram of the CPU activity monitor 24. In a start state 130, the microprocessor 20 initializes the CPU activity monitor 24 by writing to the control register 64, the time register 92, the event register 112 and the threshold register 56. In the preferred embodiment, the CPU 28 clears the read cycle flag 78 and sets the write cycle flag 80. Clearing the read cycle flag 78 and setting the write cycle flag 80 directs the CPU activity monitor 24 to monitor the data write cycles to the main memory 22.

The value loaded in the time register 92 defines the time interval. The value stored in the event register 112 defines the activity-to-inactivity transition value. The value stored in the threshold register 56 defines the activity threshold, which is the number of successive time intervals where the activity of the CPU 28 rises above the activity-to-inactivity transition value. In the preferred embodiment, if the CPU activity monitor 24 determines that the CPU 28 is inactive, the CPU activity monitor 24 remains in an inactive state until the activity of the CPU 28 rises above the activity threshold. If the CPU activity monitor 24 determines that the CPU 28 is active, the CPU activity monitor 24 remains active until the activity of the CPU 28 drops below the activity-to-inactivity transition value.

The CPU 28 also sets the retrigger timer enable flag 86 on, sets the retrigger event enable flag 87 on, sets the activity notify flag 82 on, and sets the inactivity notify flag 84. Setting the retrigger timer enable flag 86 and the retrigger event enable flag 87 directs the CPU activity monitor 24 to reset the timer 94 and the event counter 114 upon the occurrence of the time signal 90 or the event overflow signal 102.

After the CPU activity monitor 24 is initialized, the CPU activity monitor 24 enters an initial wait state 132. While in the initial wait state 132, the CPU activity monitor 24 monitors the CPU 28. In the initial wait state 132, the CPU activity monitor will determine if the CPU 28 is active or inactive. If the CPU 28 is active, the CPU activity monitor 24 will branch to a CPU active state 134. If the CPU 28 is inactive, the CPU activity monitor 24 will branch to a CPU inactive state 138.

While in the initial wait state 132, the timing circuit 52 monitors the passage of time as the timer 94 counts down with each clock cycle of the clock signal 44. While the timing circuit 52 monitors the passage of time, the event circuit 54 monitors each data write cycle or data read cycle that accesses the main memory 22. In the preferred embodiment, the event circuit 54 monitors each data write cycle to the main memory 22. The event decoder 113 monitors the read/write signal 38, the data/control signal 40, the memory/IO signal 42, and the cache miss signal 36 to determine when the CPU 28 accesses the main memory 22.

Each data write cycle to the main memory 22 causes the event decoder 113 to generate the event detect signal 116 that drives the event counter 114. The value output by the event counter 114 and the value output by the event register 112 are continuously compared in the event comparator 104. When the value in the event counter 114 is equal to or greater than the value stored in the event register 112, the event comparator generates the event overflow signal 102.

Each assertion of the event overflow signal 102 is counted by the inactivity comparator 124 to determine when the CPU 28 reaches the activity threshold stored in the threshold register 56. The activity comparator 126 counts each time interval in which the CPU 28 executes enough activity events to rise above the activity-to-inactivity transition value. If the count is equal to or is greater than the value in the threshold register 56, the activity comparator sets the activity event flag 74. The activity event flag 74 indicates that the CPU 28 is active, and the CPU activity monitor 24 proceeds to the CPU active state 134.

In the CPU active state 134 the activity event flag 74 directs the interrupt generator 128 to generate the interrupt request 46. The interrupt request 46 notifies the CPU 28 to suspend current operations and to transfer control to the power management software 142 as discussed in more detail below. The interrupt generator 128 also resets the activity notify flag 82 to off and sets the inactivity notify flag 84 to on. Because the CPU 28 is active, setting the inactivity notify flag 84 to on directs the CPU activity monitor 24 to generate an interrupt request 46 when the CPU 28 transitions from an active state to an inactive state.

In addition, the timer 94 and the event counter 114 are reset for the next time interval. The time reset logic 98 resets the timer 94 in response to the event overflow signal 102, and the event reset logic 110 resets the event counter 114. The CPU activity monitor 24 then proceeds to an active wait state 136 as shown in FIG. 12B.

In the active wait state 136, the CPU activity monitor 24 continues to monitor the CPU 28 to determine when the CPU 28 transitions to an inactive state. In the active wait state 136, the CPU activity monitor 24 does not generate the interrupt request 46. The CPU activity monitor 24 resets the timer 94 and the event counter 114 for each new time interval.

If the CPU 28 remains active, the CPU activity monitor 24 continues to monitor the CPU 28 in the active wait state 136. However, if the CPU 28 transitions from an active state to an inactive state, the CPU activity monitor 24 transitions from the active wait state 136 to the CPU inactive state 138. In order to determine when the CPU 28 is inactive, the event overflow signal 102 and the time signal 90 connect to the inactivity comparator 124. The time signal 90 indicates that the time interval loaded into the timer 94 has expired. The event overflow signal 102 indicates that the value in the event counter 114 is equal to or greater than the activity-to-inactivity transition value loaded into the event register 112. The inactivity comparator 124 compares the event overflow signal 102 to the time signal 90 to determine which signal occurs first. If the time signal 90 occurs first, the inactivity comparator 124 sets the inactivity event flag 76. The CPU activity monitor 24 then proceeds to the CPU inactive state 138.

Therefore, when the CPU 28 transitions from an active state to an inactive state, the CPU activity monitor 24 transitions from active wait state 136 to CPU inactive state 138. As explained above, the CPU activity monitor 24 can also enter the CPU inactive state 138 from the initial wait state 132. In the CPU inactive wait state 138, the interrupt generator 128 generates the interrupt request 46 to notify the microprocessor 20 to suspend current operations and to transfer control to the power system interrupt service routine.

The interrupt generator 128 also sets the activity notify flag 82 to on, and resets the inactivity notify flag 84 to off. Setting the activity notify flag 82 to on commands the interrupt generator 128 to generate the interrupt request 46 when the CPU transitions from an inactive state to an active state. In addition, the time reset logic 98 resets the timer 94 and the event reset logic 110 resets the event counter 114 for the next time interval. The CPU activity monitor 24 then proceeds to an inactive wait state 140 as shown in FIG. 12C.

In the inactive wait state 140, the CPU activity monitor 24 does not generate the interrupt request 46. If the CPU 28 remains inactive, the CPU activity monitor 24 remains in the inactive wait state 140. If, on the other hand, the CPU 28 transitions from an inactive state to an active state, the count of the event overflow signal 102 equals or exceeds the activity threshold stored in the threshold register 56. The CPU activity monitor 24 then transitions from the inactive wait state 140 to the CPU active state 134 to repeat the process explained above.

The following example illustrates the operation of the CPU activity monitor 24. In this example, the time interval for monitoring the CPU activity monitor 24 is set to one millisecond, the activity-to-inactivity transition value is set to one (1) activity event, and the activity threshold is set to five (5) successive time intervals. An activity event is a data write cycle that generates the cache miss signal 36. The CPU 28 initializes the CPU activity monitor 24 in the start state 130 by writing to the control register 64, the time register 92, the event register 112 and the threshold register 56. The CPU 28 clears the read cycle flag 78 and sets the write cycle flag 80. Clearing the read cycle flag 78 and setting the write cycle flag 80 directs the CPU activity monitor 24 to only monitor data write cycles that generate the cache miss signal 36.

The CPU 28 loads the time register 92 with a value that defines a one-millisecond time interval. If the clock 26 runs at one megahertz (one million clock cycles per second), each clock cycle has a duration of one microsecond. Therefore, a value of 1,000 loaded into the timer register 92 represents the number of clock cycles in a one-millisecond time interval. The CPU 28 also sets the activity-to-inactivity transition value to one activity event by loading a one into the event register 112. The CPU 28 sets the threshold register 56 to five successive time intervals by loading a five into the threshold register 56. Finally, the CPU 28 sets the retrigger timer enable flag 86, the retrigger event enable flag 87, the activity notify flag 82, and the inactivity notify flag 84.

After initialization, the CPU activity monitor 24 enters the initial wait state 132. While in the initial wait state 132, the timing circuit 52 monitors the passage of time as the timer 94 counts down with each clock cycle of the clock signal 44. While the timing circuit 52 monitors the time duration, the event circuit 54 counts each activity event.

For this example, the CPU 28 is about to transition from the CPU inactive state 138 to the CPU active state 134. Each data write cycle that generates the cache miss signal 36 causes the event decoder 113 to generate the event detect signal 116 that drives the event counter 114. When active, the CPU 28 executes enough activity events to rise above the activity-to-inactivity transition value (one activity event stored in the event register), and the event comparator 104 generates the event overflow signal 102. The activity comparator 126 counts each occurrence of the event overflow signal 102 and when the count reaches equals five (the value stored in the threshold register 56), the activity comparator 126 generates the activity event flag 74. The activity event flag 74 indicates that the CPU 28 is active, and the CPU activity monitor 24 then proceeds to the CPU active state 134.

In the CPU active state 134, the activity event flag 74 directs the interrupt generator 128 to reset the activity notify flag 82 to off, to set the inactivity notify flag 84 to on, and to generate the interrupt request 46. In addition, the time reset logic 98 resets the timer 94, and the event reset logic 110 resets the event counter 114. The interrupt request 46 notifies the CPU 28 to suspend current operations, and to transfer control to the power system interrupt service routine as discussed in more detail below. The CPU activity monitor 24 then proceeds to the active wait state 136.

In the active wait state 136, the CPU activity monitor 24 continues to monitor the CPU 28 to determine when the CPU 28 transitions to an inactive state. If the CPU 28 continues to execute at least one data write cycle to the main memory 22, the CPU activity monitor 24 does not transition to the CPU inactive wait state 138. Instead, the CPU activity monitor 24 remains in the active wait state 136 and continues to reset the timer 94 and the event counter 114 at the end of each one millisecond time interval.

If the CPU 28 fails to execute a single data write cycle to the main memory 22, the timer 94 expires before the event counter 114 asserts the event overflow signal 102. The inactivity comparator 124 sets the inactivity event flag 76 to indicate that the CPU 28 is inactive, and the CPU activity monitor 24 proceeds to the CPU inactive state 138.

The inactivity event flag 76 directs the interrupt generator 128 to set the activity notify flag 82 to on, and reset the inactivity notify flag 84 to off, and to generate the interrupt request 46. The interrupt request 46 notifies the CPU 28 to suspend current operations and transfer control to the power system interrupt service routine. In addition, the time reset logic 98 resets the timer 94, and the event reset logic 110 resets the event counter 114 for the next time interval. The CPU activity monitor 24 then proceeds to the inactive wait state 140.

Figure 13:
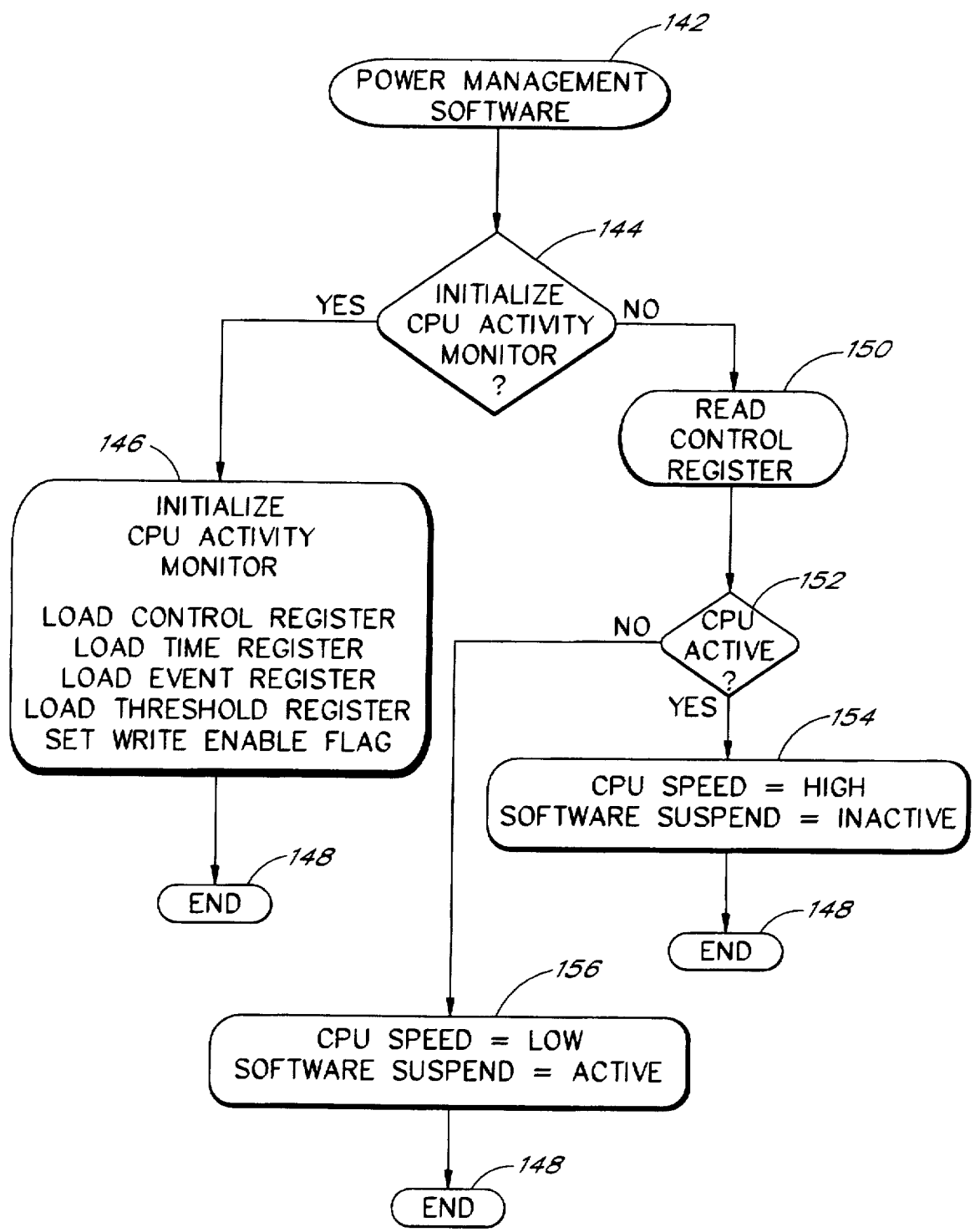
FIG. 13 is a flow chart of a power management software interrupt routine according to the present invention.

FIG. 13 shows a flowchart of the power management software 142. Together, the CPU activity monitor 24 and the power management software 142 form a power management system. The power management software 142 initializes the CPU activity monitor 24 and implements the power management strategy of controlling the CPU 28. The CPU activity monitor 24 communicates with the power management software 142 via the interrupt request 46. Thus the power management software is an interrupt service routine that manages power consumption. To conserve power, the power management software 142 can reduce CPU clock speeds and suspend CPU activity.

Whenever the interrupt request 46 invokes the power management software 142, the power management software determines which system component has generated an interrupt. The power management software flowchart in FIG. 13 only shows a flowchart for interrupts from the CPU activity monitor 24; however, other routines that service the disk drive, display, keyboard, etc., can also exist.

In a step 144, the power management software 142 determines if the CPU activity monitor 24 needs initialization. The power management software 142 initializes the CPU activity monitor 24 on power up, during system resets, etc. If initialization is necessary, the power management software proceeds to a step 146. In the step 146, the software directs the CPU 28 to initialize the CPU activity monitor 24 by writing to the control register 64, the time register 92, the event register 112 and the threshold register 56. The initialization of the CPU activity monitor 24 in the step 146 corresponds to the start state 130 in the CPU activity monitor state diagram, as shown in FIG. 12A.

After initializing the CPU activity monitor 24, the power management software proceeds to a step 148 to end the interrupt service routine. The completion of the interrupt service routine returns control of the CPU 28 to the operating software. Although the power management software 142 is no longer active, the CPU activity monitor 24 continues to monitor the CPU 28.

Returning to the step 144, if the software does not need to initialize the CPU activity monitor 24, the software proceeds to a step 150. In the step 150, the software reads the status of the activity event flag 74 and the inactivity event flag 76 from the control register 64, and then proceeds to a step 152. If, for example, the CPU is active, the software in the step 152 determines that the activity event flag 74 is asserted and proceeds to the step 154. In the step 154, the power management software 142 sets the CPU clock speed to a maximum speed. After setting the CPU clock speed high, the power management software 142 ends in a step 148.

Returning to the step 152, if the CPU is inactive, the power management software 142 determines that the inactivity event flag 76 is set and then proceeds to a step 156. In the step 156, the power management software reduces the CPU clock speed. If the CPU 28 remains inactive, the power management software 142 can enable a suspend mode to reduce power further.

Figure 14:
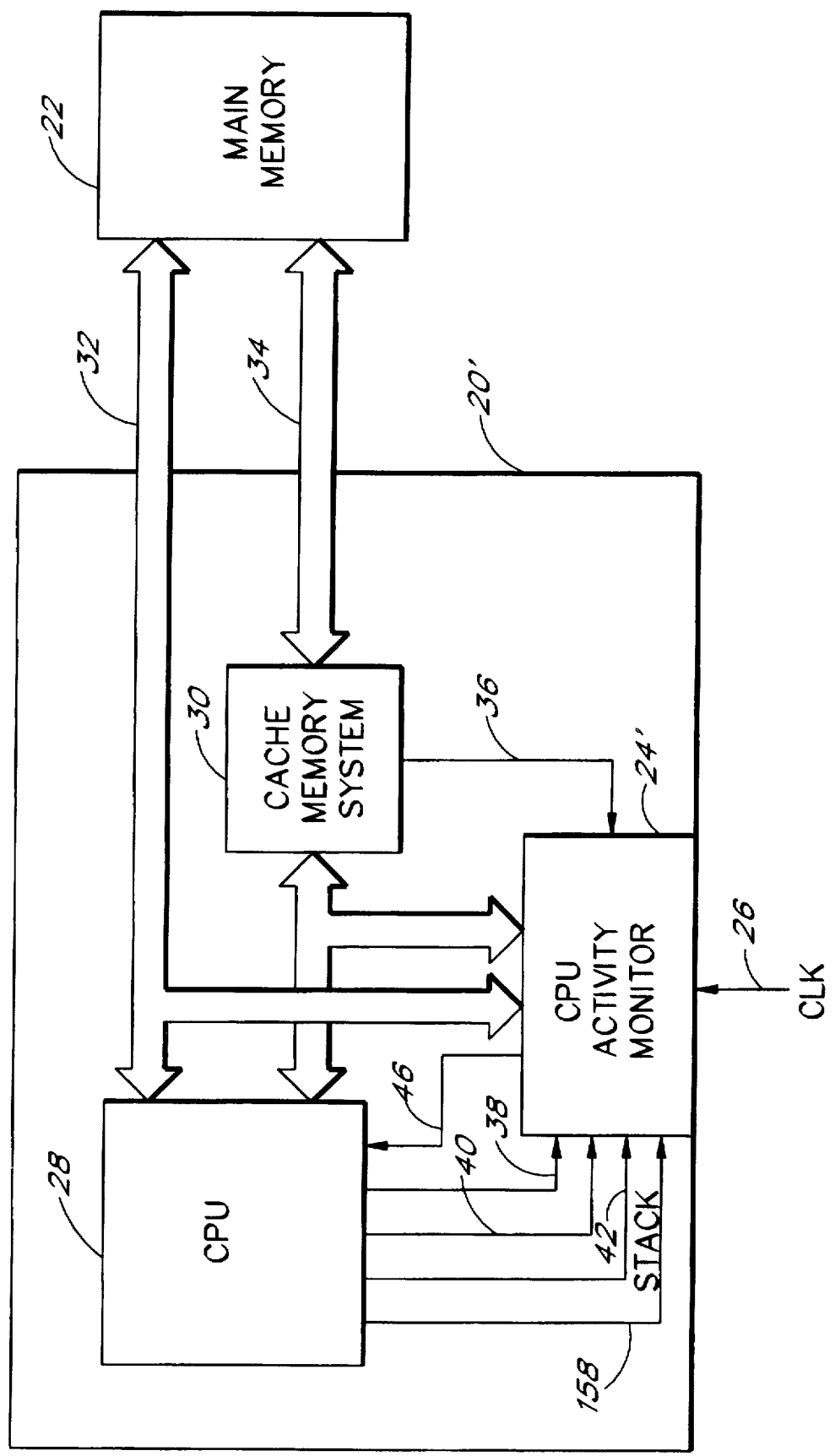
FIG. 14 is a block diagram of an alternative embodiment of the CPU activity monitoring system comprising a microprocessor, a main memory, and a clock wherein the microprocessor further includes a CPU, a cache memory system and a CPU activity monitor.

In other embodiments, the CPU activity monitor can exist on-chip with the CPU 28 and the cache memory system 30. For example, FIG. 14 shows a microprocessor 20' having the CPU 28, the on-chip cache memory system 30, and an on-chip CPU activity monitor 24'. Preferably, the on-chip CPU activity monitor 24' includes the control circuit 50, the timing circuit 52, the event circuit 54, the threshold register 56, and the activity notification circuit 58 discussed above and shown in FIG. 3. The on-chip CPU activity monitor 24' continues to monitor the read/write signal 38, the data/control signal 40, the memory/IO signal 42, the cache miss signal 36 and the clock 26.

In addition, the on-chip activity monitor 24' may also receive a stack information signal 158. The stack information signal 158 provides information about accesses to the stack (not shown). The stack is a region of reserved memory in which programs store status data such as procedure and function call return addresses, passed parameters, and local variables. The microprocessor, the operating system, and application programs access the stack. The stack is assigned a location in the cache memory system 30 or the main memory 22, for example, and the on-chip CPU activity monitor 24' can track stack accesses by monitoring the stack information signal.

Figure 6:
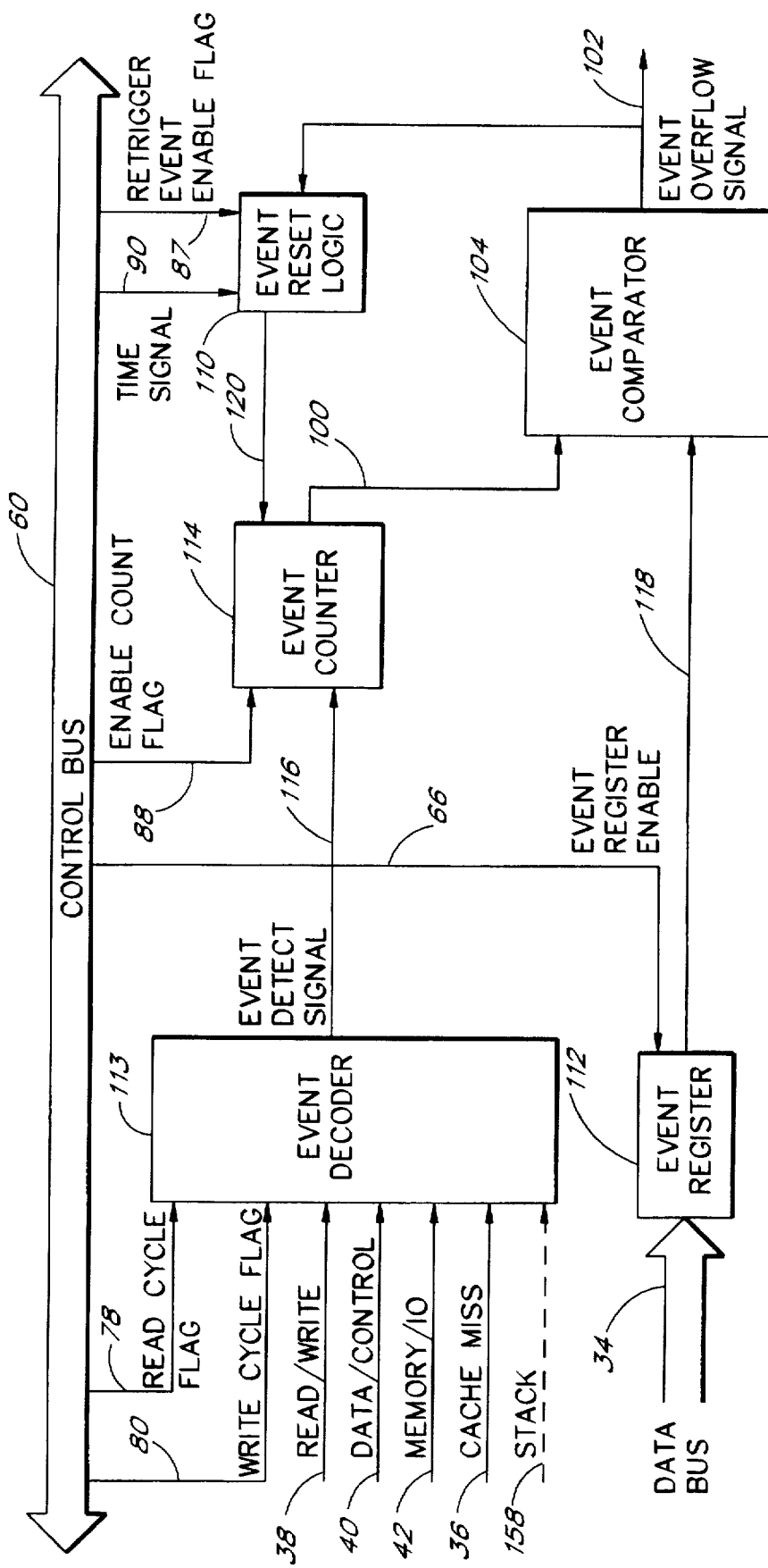
FIG. 6 s a block diagram of the event circuit comprising an event decoder, an event counter, an event comparator, an event reset logic and an event register.

The stack information signal is input to the event decoder 113 as shown in FIG. 6. The stack information signal 158 indicates that the CPU 28 is accessing the stack. If a stack memory location does not exist in the cache memory system 30, the CPU 28 accesses the main memory 22 and generates the cache miss signal 36. The stack information signal 158 commands the event counter 114 (FIG. 6) to ignore any activity events. For example, if the stack information signal 158 is asserted, the event counter 114 does not count a write cycle that generates the cache miss signal 36. If the stack information signal 158 is not asserted, the event counter 114 operates as explained in the preferred embodiment.

The embodiments of the CPU activity monitor 24, 24' enclosed herein monitor the CPU 28 to determine when the CPU 28 is engaged in useful activity. As explained above, the CPU 28 is engaged in useful activity when the CPU 28 does not repetitively access the same locations in the main memory 22. Therefore, it is desirable to differentiate repetitive accesses by the CPU 28 to main memory 22 (i.e. accesses to the stack, to the instructions in a repeating routine, or to the data locations in a repeating routine) from non-repetitive accesses by the CPU 28 to the main memory 22.

When the CPU 28 repetitively accesses the same locations in main memory 22, the cache memory system 30 stores the needed data. If however, the CPU 28 is actively engaged in useful work, the CPU 28 periodically accesses data that is not stored in the cache memory system 30 causing the cache memory system to generate the cache miss signal 36. The CPU activity monitor 24 counts each occurrence of the cache miss signal 36 during a data write cycle or data read cycle. The count is compared to the activity-to-inactivity transition value and the activity threshold to determine when the CPU is inactive or active.

While the above detailed description has shown, described and pointed out the fundamental novel features of the invention as applied to various embodiments, it will be understood that various omissions and substitutions and changes in the form and details of the illustrated device may be made by those skilled in the art, without departing from the spirit of the invention

What is claimed is:

1. A processing unit activity monitoring device comprising:

a timer in communication with a clock, said timer providing a time signal that indicates an end of a time interval;

a stack information signal which indicates when a processor accesses a stack;

a counter in communication with said processor and a cache memory unit, said counter receiving a cache miss signal and said processor stack information signal wherein said cache miss signal and said stack information signal determine an occurrence of an activity event, said counter counting each activity event to provide a count; and a comparator in communication with said time signal and said counter, said comparator further receiving an activity threshold value, wherein said comparator compares said count provided by said counter with said activity threshold value during said time interval to provide an event signal that indicates the magnitude of said count with respect to said activity threshold.

2. The processor activity monitoring device as defined in claim 1, further comprising a first storage location for storing an activity-to-inactivity transition value.

3. The processor activity monitoring device as defined in claim 2, further comprising a second storage location for storing an inactivity-to-activity threshold.

4. A central processing unit ("CPU") activity monitoring device comprising:

a timer in communication with a clock, said timer providing a time signal that indicates an end of a time interval;

a counter in communication with a CPU and a cache memory unit, said counter receiving a cache miss signal and a CPU stack information signal which indicates when said CPU accesses a stack, wherein said cache miss signal and said CPU stack information signal determine an occurrence of an activity event, said counter counting each activity event to provide a count;

a storage location for storing an activity-to-inactivity transition value; and a comparator in communication with said time signal, said counter, and said storage location, wherein said comparator compares said count with said activity-to-inactivity transition value during said time interval to provide an activity event flag that indicates a transition by said CPU from an inactive state to an active state.

5. The CPU activity monitoring device as defined in claim 4, wherein said activity-to-inactivity transition value specifies a maximum number of activity events that may occur within said time interval.

6. The CPU activity monitoring device as defined in claim 5, wherein said activity events are data write and data read cycles to main memory that generate a cache miss signal.

7. The CPU activity monitoring device as defined in claim 5, wherein said activity events are data write cycles to main memory that generate a cache miss signal.

8. The CPU activity monitoring device as defined in claim 7, further comprising:

an inactivity event flag in communication with said comparator, said comparator asserting said inactivity event flag in response to a transition by said CPU from said active state to said inactive state.

9. The CPU monitoring system as defined in claim 8, further comprising an interrupt request signal in communication with said activity event flag and said inactivity event flag, said interrupt request signal responsive to the assertion of said activity event flag or said inactivity event flag.

10. A CPU activity monitoring device comprising:

a timer in communication with a clock, said timer providing a time signal that indicates an end of a time interval;

a counter in communication with a CPU and a cache memory unit, said counter receiving a cache miss signal and a plurality of CPU mode signals wherein said cache miss signal and said plurality of CPU mode signals determine an occurrence of an activity event, said counter counting each activity event to provide a count;

a first storage location for storing an activity-to-inactivity transition value said activity-to-inactivity transition value defining the number of activity events which signal when said CPU transitions from an active state to an inactive state;

an inactivity comparator coupled to said timer, said counter, and said first storage location, wherein said inactivity comparator compares said activity-to-inactivity transition value with said count of said activity events to provide an inactivity event flag;

a second storage location for storing an activity threshold, said activity threshold defining the number of successive time intervals in which the number of said activity events rise above the activity-to-inactivity transition value; and an activity comparator in communication with said time signal, said counter, and said second storage location, wherein said activity comparator compares said count of said successive time intervals with said activity threshold to provide an activity event flag.

11. The CPU activity monitoring device as defined in claim 10, wherein said activity-to-inactivity transition value specifies the maximum number of activity events that may occur within said time interval.

12. The CPU activity monitoring device as defined in claim 10, further comprising an interrupt request signal in communication with said inactivity event flag and said activity event flag, said interrupt requests signal responsive to an assertion of said inactivity event flag or an assertion of said activity event flag.

13. The CPU activity monitoring device as defined in claim 10, wherein said activity events are data write cycles to main memory that generate a cache miss signal.

14. A method for monitoring processor activity comprising the steps of:

defining a time interval;

generating a cache miss signal;

generating a a stack information signal which communicates when a processor accesses a stack;

monitoring said stack information signal and said cache miss signal to determine an activity event;

counting each activity event; and putting said processor into an active or an inactive state in accordance with said count of said activity events that occur within said time interval.

15. A method for monitoring processor activity comprising the steps of:

defining a time interval;

generating a clock signal;

monitoring said clock signal to determine an end of said time interval;

generating a stack information signal which communicates when a processor accesses a stack;

generating a cache miss signal when data is not stored in a cache memory system;

monitoring said plurality of mode signals and said stack information signal to determine an activity event;

counting each activity event that occurs within said time interval;

defining an activity transition value which corresponds to a minimum number of said activity events that an active processor generates within said time interval; and generating an event signal when said processor transitions from an active state to said inactive state, or when said processor transitions from said inactive state to said active state.

16. The method as defined in claim 15, wherein said activity event is a data write cycle or a data read cycle that generates a cache miss signal.

17. The method as defined in claim 15, wherein said activity event is a data write cycle that generates a cache miss signal.

18. A method for monitoring CPU activity comprising the steps of:

defining a time interval;

generating a clock signal;

monitoring said clock signal to determine the expiration of said time interval;

generating a plurality of mode signals that correspond to the operating mode of a central processing unit;

generating a cache miss signal when data is not stored in a cache memory system; and monitoring said plurality of mode signals and said cache miss signal to determine an activity event;

counting each activity event that occurs within said time interval;

defining an activity-to-inactivity transition value which specifies the maximum number of said activity events occurring within said time interval when said CPU transitions from an active state to an inactive state;

generating an inactivity event signal when said time interval expires before said count of said activity events is greater than said activity-to-inactivity transition value;

defining an activity threshold value which Specifies the number of successive time intervals in which the number of CPU activity events rise above the activity-to-inactivity transition value; and generating an activity event signal when said count of said activity events occurring within said successive time intervals is equal to or greater than said activity threshold.

19. The method as defined in claim 18, wherein said activity event is a data write cycle or a data read cycle that generates a cache miss signal.

20. The method as defined in claim 18, wherein said activity event is a data write cycle that generates a cache miss signal.

* * * * *